United States Patent [19]

Kimura et al.

[11] Patent Number: 5,720,371
[45] Date of Patent: Feb. 24, 1998

[54] ROLLING BEARING CLUTCH

[75] Inventors: Katsumi Kimura, Kanagawa-ken; Kaoru Hoshide, Tokyo, both of Japan

[73] Assignees: Ebara Corporation; THK Corporation Limited, both of Tokyo, Japan

[21] Appl. No.: 661,548

[22] Filed: Jun. 11, 1996

[30] Foreign Application Priority Data

Jun. 12, 1995 [JP] Japan ................... 7-169216

[51] Int. Cl.⁶ ........................................... F16D 41/06
[52] U.S. Cl. ........................... 192/44; 192/38; 192/45; 192/65
[58] Field of Search ........................... 192/45, 38, 54.3, 192/65, 44

[56] References Cited

U.S. PATENT DOCUMENTS

| | | |
|---|---|---|
| 1,788,301 | 1/1931 | Humfrey . |
| 1,955,879 | 4/1934 | Griswold ................. 192/48 |
| 1,955,880 | 4/1934 | Vincent ................... 192/47 |
| 3,381,879 | 5/1968 | Takata ..................... 192/45 |
| 3,557,921 | 1/1971 | Takada .................... 192/45 |
| 5,035,309 | 7/1991 | Takada .................... 192/45 |
| 5,109,964 | 5/1992 | Fukui et al. ............ 192/45 X |
| 5,211,273 | 5/1993 | Castens ................... 192/45 |
| 5,219,053 | 6/1993 | Castens ................... 192/45 |
| 5,309,781 | 5/1994 | Takata .................. 192/45 X |
| 5,328,012 | 7/1994 | Takata .................... 192/45 |

FOREIGN PATENT DOCUMENTS

| | | |
|---|---|---|
| 609.572 | 8/1926 | France . |
| 1146710 | 4/1963 | Germany . |
| 25 14 738 | 10/1976 | Germany . |
| 49-15847 | 2/1974 | Japan . |
| 51-21093 | 6/1976 | Japan . |
| 52-60367 | 5/1977 | Japan . |
| 55-36852 | 9/1980 | Japan . |
| 60-34529 | 2/1985 | Japan . |
| 5-149352 | 6/1993 | Japan . |
| 6-74259 | 3/1994 | Japan . |
| 6-330963 | 11/1994 | Japan . |
| 2 241 755 A | 9/1991 | United Kingdom . |
| 93/00519 | 1/1993 | WIPO . |

OTHER PUBLICATIONS

European Patent Office Communication with European Search Report for European Patent Application No. 96109321.8 dated Oct. 21, 1996.

*Primary Examiner*—Rodney H. Bonck
*Assistant Examiner*—Saul J. Rodriguez
*Attorney, Agent, or Firm*—Armstrong, Westerman, Hattori, McLeland & Naughton

[57] ABSTRACT

A rolling bearing clutch including an inner ring, an outer ring and a plurality of rollers interposed between the track surfaces formed on the inner and outer rings, said rollers are inclined with a predetermined twist angle ($\beta$) relative to the center axis of the rings, each of the track surfaces of the inner and outer rings exhibits a hyperboloid contour, and when rings are relatively rotated in one direction, the rolling bearing clutch is brought into the locked condition and the clutch is freely rotatable in a reverse direction, wherein the rolling contact angle of at least one of contact portions of each of the rollers with the track surfaces as seen in the axial direction of the rollers is set to be larger than the frictional angle corresponding to the static frictional coefficient at the contact portion, whereby when the rings are rotated in the locking direction, the rollers can slide at the contact portions with the track surfaces, thrusting means is provided for allowing the track surfaces of the inner ring and the outer ring to come near each other, the inner and outer rings are locked by thrusting outer ring by the thrusting means while the inner and outer rings are rotated in locking direction, whereby the clutch is brought in the ON condition and the clutch is brought in the OFF condition by allowing the rollers to slide at the contact portions with the track surfaces by releasing the thrusting means from the thrust condition, whereby the rolling bearing clutch is not necessary to perform screw-back operation when the clutch is shifted to OFF condition.

13 Claims, 11 Drawing Sheets

SCREWED AND LOCKED → REVERSED AND RELEASED FROM SCREWED POSITION → RELEASE OUTER RING BY PUSHING WITH AIR

5,720,371

ROLLING BEARING CLUTCH

BACKGROUND OF THE INVENTION

1. Field of the Art

The present invention relates to a rolling bearing clutch for performing ON/OFF operations by allowing the track surfaces of an inner ring and an outer ring to be moved close to each other or be moved away from each other.

2. Prior Art

A rolling bearing clutch is hitherto known.

Figure 10A:
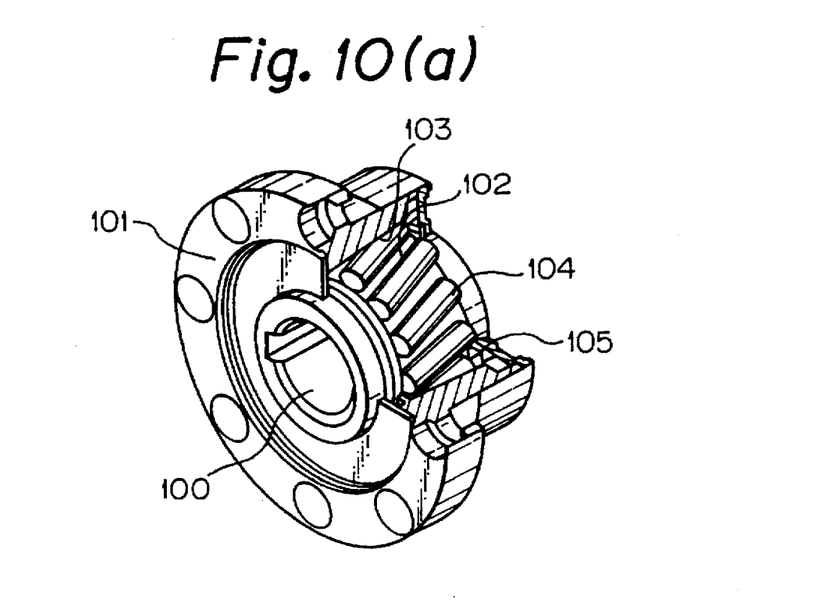
FIG. 10(a) is a partially sectioned perspective view of the rolling bearing clutch and FIGS. 10(b) and 10(c) are diagrams showing the operation of the rolling bearing clutch.
Figure 10B:
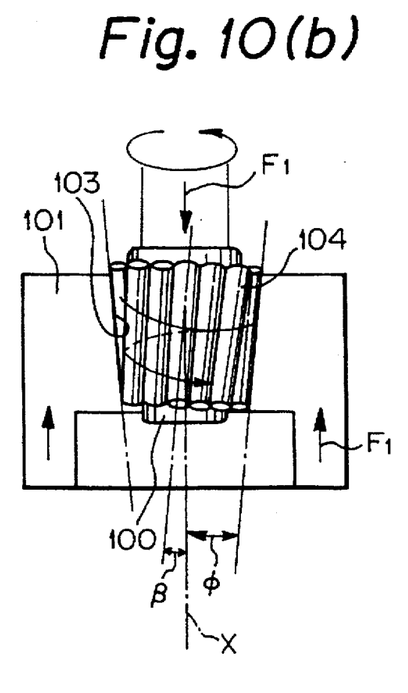
Figure 10C:
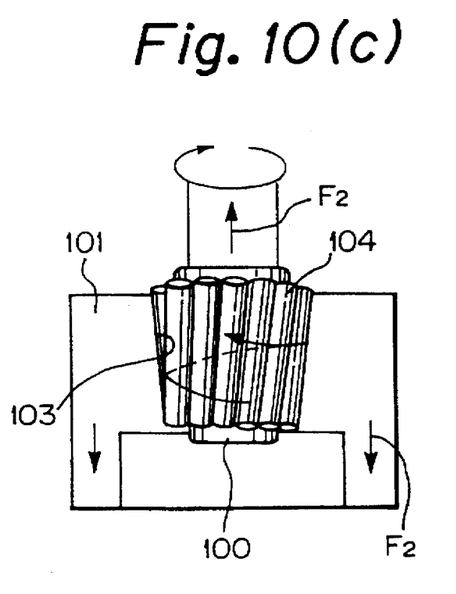

For example, a typical conventional rolling bearing clutch is shown in FIG. 10.

Specifically, the rolling bearing clutch includes an inner ring 100, an outer ring 101 and a plurality of rollers 104 interposed between the outer periphery of the inner ring 100 and the inner periphery of the outer ring 101 as shown in FIG. 10(a). The rollers 104 are arranged in the inclined condition with a predetermined twist angle β relative to the center axis X of the inner and outer rings 100 and 101 as shown in FIG. 10(b). A track surface 102 of the outer periphery of the inner ring 100 exhibits a substantially convergent cone-like taper surface, and a track surface 103 of the inner periphery of the outer ring 101 is also formed to have a substantially conical shape corresponding to the track surface 102 of the inner ring 100. More precisely, since each of rollers 104 come into line contact with track surfaces 102 and 103, each of track surfaces 102 and 103 exhibits a single hyperboloid contour that is a locus scribed by rotating the rollers 104 about the center axis X. The inner and outer rings 100 and 101 are inclined with a predetermined socket angle α relative to the center axis X.

The rollers 104 come into contact with the track surfaces 102 and 103 of the inner and outer rings 100 and 101 with the predetermined twist angle β, and as the inner and outer rings rotate, the rollers 104 are spirally rotated between the track surfaces 102 and 103.

When the inner ring 100 is rotated in the outer ring 101 via the rollers 104 in the squeezing-in or advanced direction as shown in FIG. 10(b), a clutch component F1 operating to draw the inner ring 100 and the outer ring 101 near to each other as the rollers 104 roll appears, causing the rollers 104 between the inner ring 100 and the outer ring 101 to be brought into a locked condition thereby enabling torque to be transmitted.

On the other hand, when the inner ring 100 is rotated in a reverse direction, a rolling component F2 effective for allowing the inner and outer rings 100 and 101 to be parted away from each other as the rollers 104 roll appears as shown in FIG. 10(c), to thereby enable the rollers 104 to rotate freely.

The rolling bearing clutch is utilized as a one-way clutch adapted to transmit torque in one direction and freely rotate in the other direction by utilizing the aforementioned characteristics. It should be noted that a plurality of preliminary pressure springs 105 for imparting a light preliminary pressure between the inner ring 100 and the outer ring 101 are disposed to bring the rollers 104 into initial contact with the inner and outer rings 100 and 101.

Figure 11A:
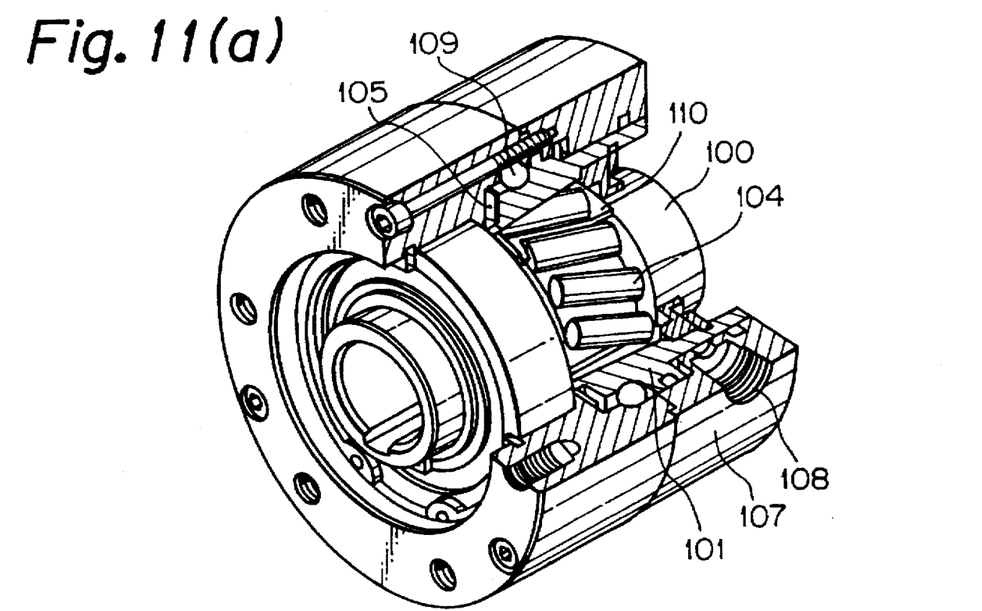
FIG. 11(a) is a partially sectional perspective view of the rolling bearing clutch and FIG. 11(b) is a diagram showing the operation of the rolling bearing clutch.
Figure 11B:
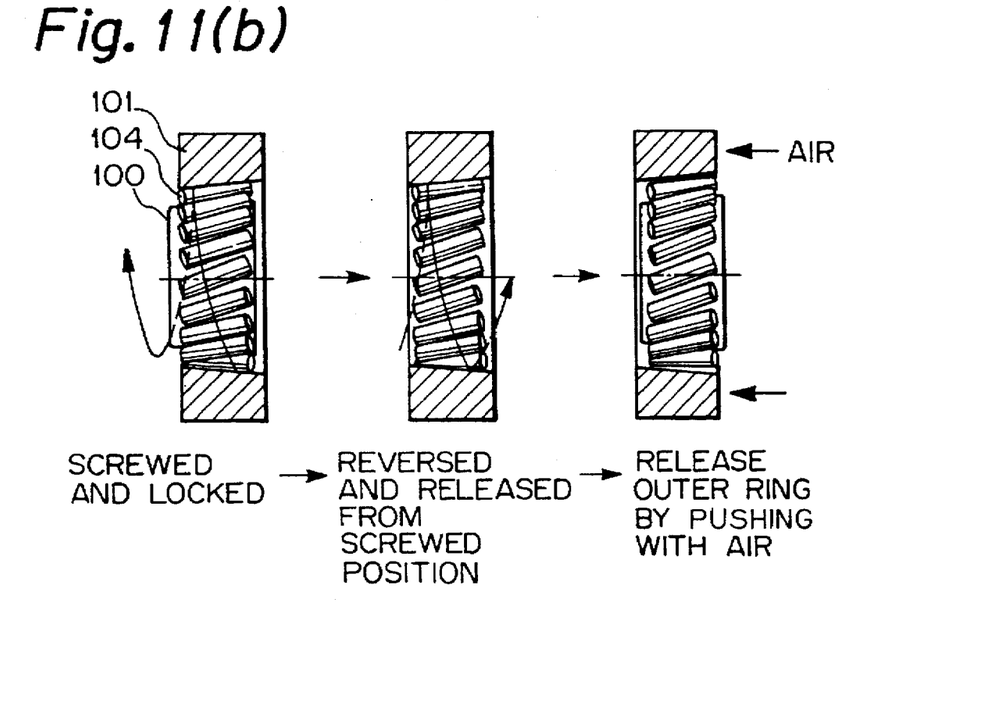

When the rolling bearing clutch as constructed above is utilized as an ON/OFF clutch, a rolling bearing clutch having the structure as shown in FIG. 11 is hitherto known. FIG. 11(a) is a partial sectional perspective view which shows the entire structure of the ON/OFF clutch, and FIG. 11(b) shows sectional views which explain operations of the ON/OFF clutch. As shown in FIG. 11(a), the outer ring 101 of the rolling bearing clutch is received in a cylinder 107 as a piston. By feeding fluid pressure such as air pressure or the like through a port 108, the outer ring 101 is displaced in such a direction that the rollers 104 and the track surfaces 102 and 103 of the inner and outer rings 100 and 101 do not come in contact with each other, thereby enabling the rollers 104 to be rotated in normal and reverse directions. By interrupting the feeding of air, the rollers 104 are brought into contact with the track surfaces 102 and 103 of the inner and outer rings 100 and 101 so that rotation of the rollers 104 is locked in one direction. Incidentally, a ball spline 109 is interposed between the cylinder 107 and the outer ring 101. Reference numeral 110 denotes a retainer.

With the above-described structure of the ON/OFF clutch, however, when the clutch is shifted to the OFF condition after it is once shifted to the ON condition by squeezing the rollers in the clutch, it is required that the outer ring be reversely rotated to release the squeezed rollers from the clutch before the outer ring is released from the locked condition by reversely thrusting the outer ring using compressed air. Namely, the conventional ON/OFF clutch has a drawback that a free condition can not be restored after it is once shifted to the locked condition unless the rollers are screwed back by a distance equal to screwing-in during torque loading to thereby nullify the torque of the clutch.

In addition, another problem of the conventional ON/OFF clutch is restriction of application, because it can function only as a one-way clutch for transmitting torque in a single direction.

The present invention has been made to overcome the aforementioned drawbacks and its object resides in providing a rolling bearing clutch which does not need any screwing-back operation when the clutch is shifted to an OFF condition and which assures that the clutch can be shifted to the OFF condition even during torque loading.

SUMMARY OF THE INVENTION

To accomplish the above object, according to a first aspect of the present invention, a rolling bearing clutch includes an inner ring, an outer ring and a plurality of rollers interposed between the track surfaces of the outer periphery of the inner ring and the inner periphery of the outer ring and is constructed such that the rollers are provided with a predetermined twist angle (β) relative to the center axis of the inner and outer rings. Each of the track surfaces of the inner ring and the outer ring is formed by a hyperboloid contour that is a revolving locus scribed when the rollers are rotated about the center axis, and when the inner and outer rings are relatively rotated in one direction, the inner and outer rings are locked and when said inner and outer rings are relatively rotated in another direction, said inner and outer ring are fleely rotatable. The rolling contact angle of at least one of the contact portions of the each roller with the track surfaces of the outer ring and the inner ring as seen in the axial direction of the rollers is set to be larger than the frictional angle corresponding to the static frictional coefficient of the contact portion. Thus, while the inner and outer rings are relatively rotated in the one direction, the rollers can slide at the contact portion with the track surfaces of the inner ring and the outer ring. Thrusting means is provided to allow the track surfaces of the inner ring and the outer ring to come near to each other. The rolling bearing clutch is brought into the ON condition where the inner and outer rings are locked by thrusting the outer ring while the inner and outer rings are rotated in the one direction. The rolling bearing clutch is brought into the OFF condition by allowing the rollers to slide at the contact portions with the track surfaces of the inner ring and the outer ring by releasing the thrusting means from the thrust condition.

In addition, according to a second aspect of the present invention, a rolling bearing clutch includes an inner ring, an outer ring and a plurality of rollers interposed between the track surfaces of the outer periphery of the inner ring and the inner periphery of the outer ring and is constructed such that the rollers are provided with a predetermined twist angle ($\beta$) relative to the center axis of the inner and outer rings. Each of the track surfaces of the inner ring and the outer ring is formed by a hyperboloid contour that is a revolving locus scribed when the rollers are rotated about the center axis, and when the inner and outer rings are relatively rotated in one direction, the inner and outer rings are brought into a locked condition and when said inner and outer rings are relatively rotated in another direction, said inner and outer rings are fleely rotatable. The rolling bearing clutch is provided with thrusting means for allowing the track surfaces of the inner ring and the outer ring to come near to each other. The rolling bearing clutch is shifted to the ON condition where the inner and outer rings being locked by thrusting the inner or outer ring by way of a thrusting means with the inner and outer rings being relatively rotated in another direction opposite to the one direction. The rolling bearing clutch is shifted to the OFF condition with the inner and outer rings being freely relatively rotatable by releasing the thrusting means from the thrust condition.

According to the first aspect of the present invention, the track surfaces of the inner ring and the outer ring are caused to come near to each other by under the action of the thrusting means while the inner and outer rings are relatively rotated in the one direction, and an input shaft and an output shaft are mechanically coupled to each other by bringing the rolling bearing clutch into the ON condition where the inner and output rings are locked. When the thrusting means is released from the thrust condition during torque loading, the rollers can slide at the contact portions with the inner ring and the outer ring, causing the rolling bearing clutch to be shifted to the OFF condition, whereby mechanical coupling of the input shaft and the output shaft can be immediately disconnected.

With the conventional rolling bearing clutch, when the inner and outer rings are rotated in the locking direction, the rollers are seized between the track surfaces of the inner and outer rings and the space between the inner and outer rings is tightened in the manner of a taper screw. Thus, when the rolling bearing clutch is shifted to the OFF condition, it is required that it be screwed back. On the contrary, according to the present invention, the rollers are allowed to slide when the thrusting force is released so that they can roll between the track surfaces of the inner and outer rings without any seizing.

According to a second aspect of the present invention, the track surfaces of the inner ring and the outer ring come in contact with the rollers by thrusting the inner or outer ring while the inner and outer rings are relatively rotated in another direction opposite to the one direction. Thus, the input shaft and the output shaft can be mechanically coupled by locking the inner and outer rings and shifting the rolling bearing clutch to the ON condition. When the thrusting means is released from the thrust condition during torque loading, the rollers are caused to roll in such a direction that the outer ring and the inner ring are parted away from each other so that the rollers roll on the track surfaces while sliding thereon, causing the rolling bearing clutch to be shifted to the OFF condition, whereby mechanical coupling of the input shaft and the output shaft can be immediately disconnected.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIGS. 2(a) to 2(c) are illustrative views of a rolling bearing clutch shown in FIG. 1, wherein

FIGS. 3(a) to 3(c) are illustrative views of track surfaces of the rolling bearing clutch, wherein

FIGS. 4(a) to 4(c) are illustrative views for explaining the wedge angle of rollers, wherein

FIGS. 10(a) to 10(c) are illustrative views of a conventional rolling bearing clutch, wherein

FIGS. 11(a) and 11(b) are illustrative views of another conventional rolling bearing clutch, wherein

PREFERRED EMBODIMENTS OF THE INVENTION

Figure 1:
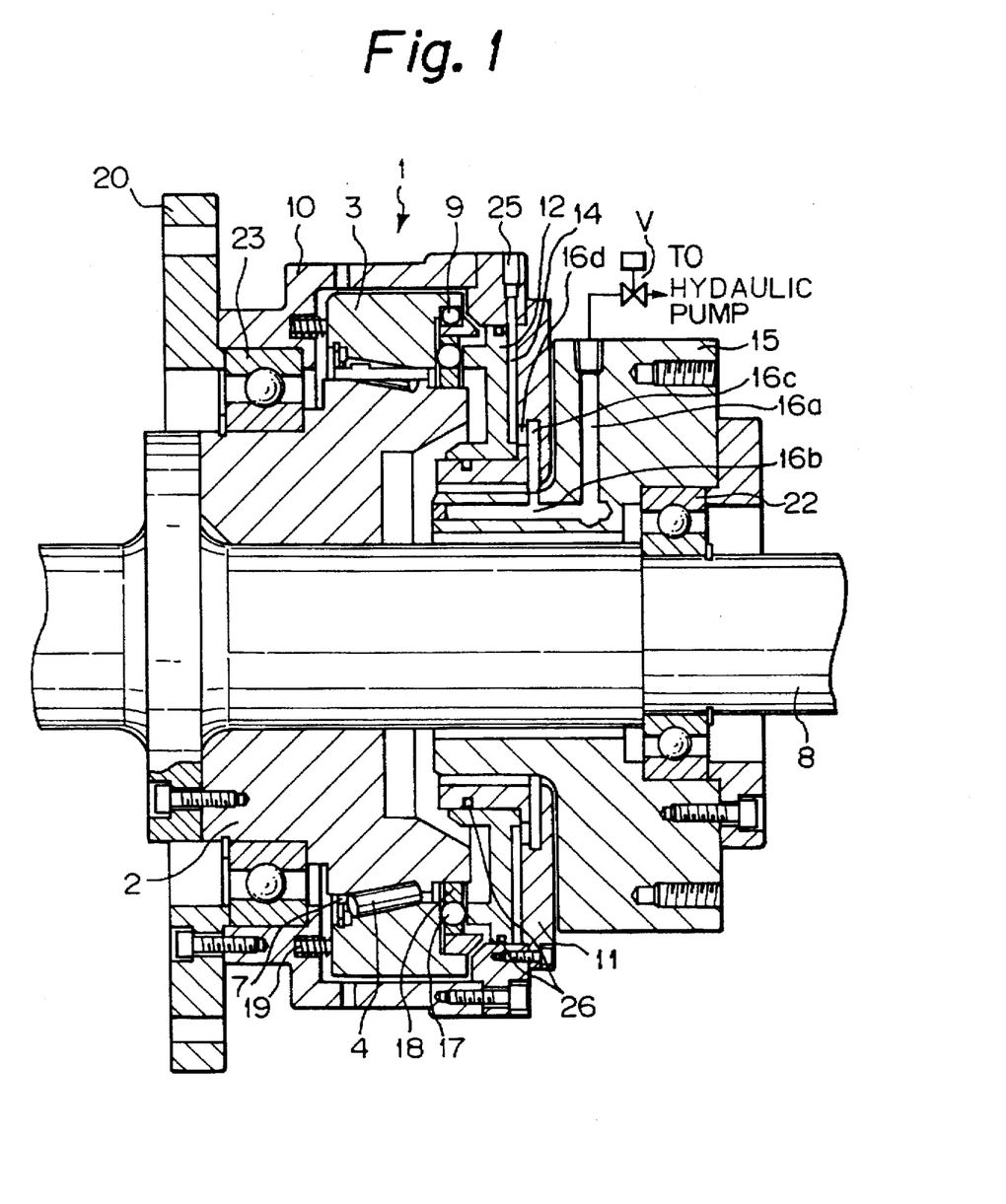
FIG. 1 is a sectional view showing a rolling bearing clutch according to a first embodiment of the present invention.

The present invention will be described in detail hereinafter with reference to the accompanying drawings which illustrate preferred embodiments of a rolling bearing clutch of the present invention. FIG. 1 is a sectional view of a rolling bearing clutch according to a first embodiment of the present invention.

The rolling bearing clutch 1 includes an inner ring 2, an outer ring 3, a plurality of cylindrical rollers 4 interposed between the outer periphery of the inner ring 2 and the inner periphery of the outer ring 3, and a retainer 7 for holding the rollers 4 at predetermined conditions. The inner ring 2 is connected directly to an output shaft 8. The outer ring 3 is connected to an outer annulus 10 via a ball spline mechanism 9. By the arrangement of the ball spline mechanism, the outer ring 3 is relatively displaceable in the axial direction of the outer annulus 10, while it is rotated together with the outer annulus 10. In addition, an input shaft 20 (shown as a flange) is fixed to the outer annulus 10.

An inner annulus 11 is fixed to the outer annulus 10 and the space surrounded by the outer annulus 10 and the inner annulus 11 constitutes a cylinder portion in which a piston 12 is arranged to move in the axial direction. A clutch ON/OFF working oil chamber 14 is defined between the inner surface of the cylinder portion and the piston 12 so that working oil is fed into the working oil chamber 14 via working oil feeding passages 16a, 16b, 16c and 16d formed in a stationary flange 15 and the inner annulus 11. The working oil feeding passage 16a is connected to an oil pump (not shown) via a control valve V. In addition, a working oil discharge nozzle 25 communicated with the working oil chamber 14 is disposed in the outer annulus 10.

A plurality of thrust balls 17 are interposed between the piston 12 and the outer ring 3 which allow the relative rotational movement therebetween. The thrust balls 17 are retained by a circular disc-like retainer 18. A plurality of preliminary pressure springs 19 are disposed between the opposing surfaces of the outer ring 3 and the outer annulus 10. The outer ring 3 is normally thrust in the rightward direction by the resilient force of the preliminary pressure springs 19. In addition, a radial bearing 22 is interposed between the stationary flange 15 and the output shaft 8, and moreover, a radial bearing 23 is interposed between the outer annulus 10 and the inner ring 2. In the drawing, reference numeral 26 denotes an O-ring seal.

Next, the relationship between the inner ring 2, the outer ring 3 and the rollers 4 will be described below in detail.

Figure 2A:
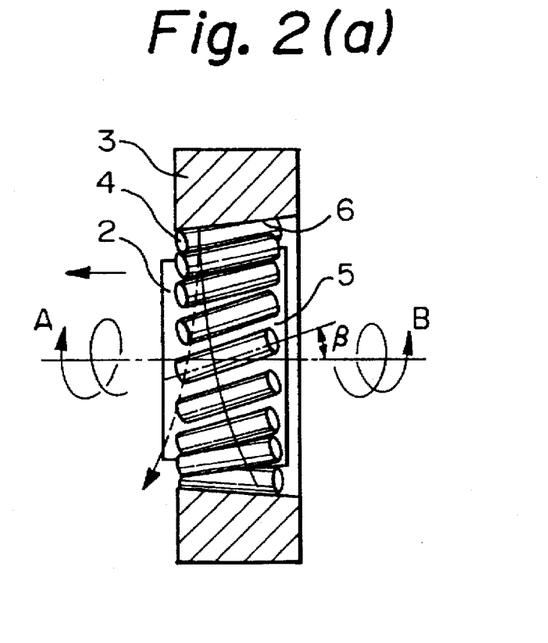
FIG. 2(a) is a schematic sectional view showing the relationship between the inner ring, the outer ring and the rollers.
Figure 2B:
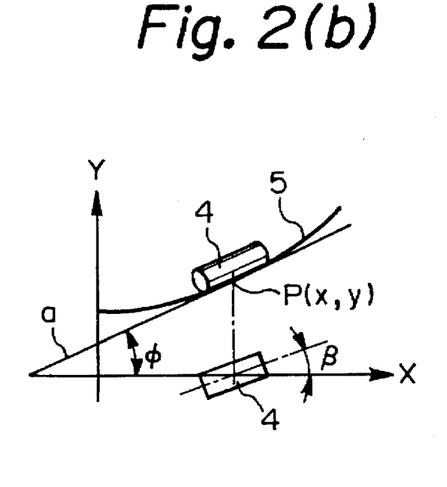
FIGS. 2(b) and 2(c) are diagrams showing the relationship between the rollers and the track surfaces.
Figure 2C:
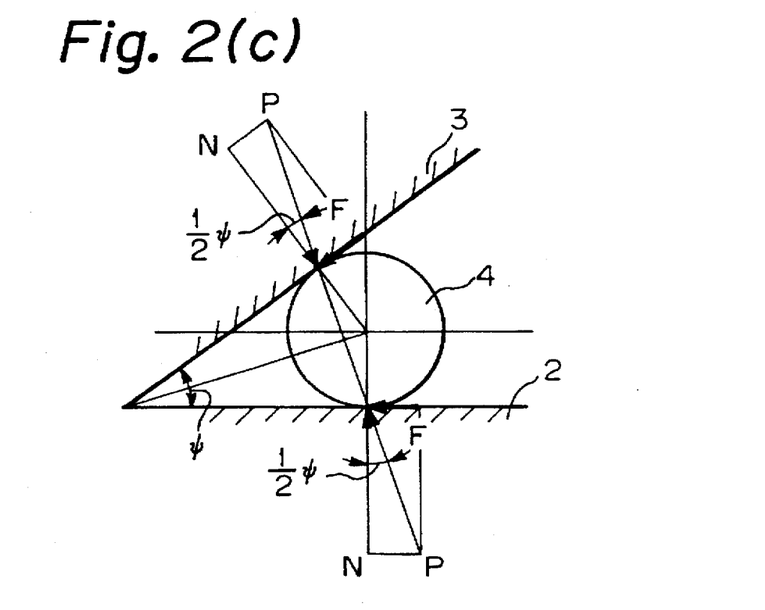

FIG. 2 is a diagrammatic illustration which shows the relationship between the inner ring 2, the outer ring 3 and the roller 4 wherein FIG. 2(a) is a schematic sectional view which shows the inner ring 2, the outer ring 3 and the rollers 4 and FIGS. 2(b) and 2(c) are views which show the relationship between the rollers and the track surfaces. As shown in FIGS. 2(a) and 2(b), the rollers 4 are arranged with a predetermined twist angle β relative to the center axis X. The track surface 5 of the outer periphery of the inner ring 2 exhibits a substantially convergent cone-like taper contour, and the track surface 6 of the inner periphery of the outer ring 3 is formed in a substantially conical shape corresponding to the track surface 5 of the inner ring 2.

Figure 3A:
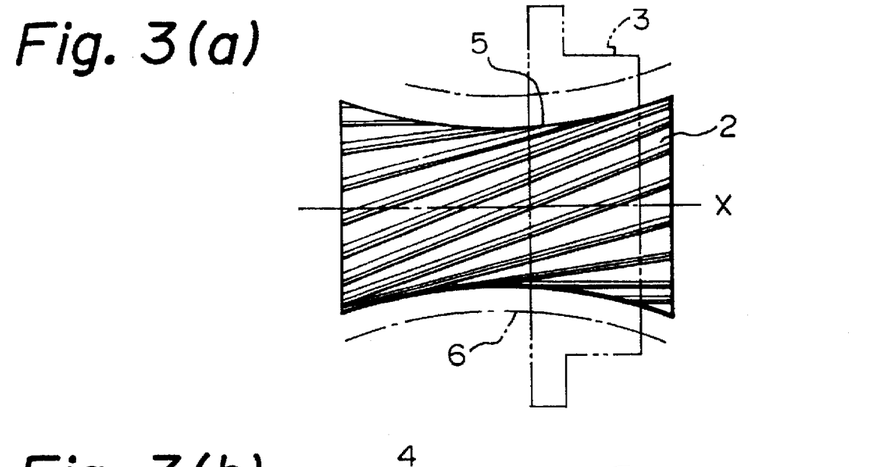
FIG. 3(a) is a view showing track surfaces of the inner ring and the outer ring.
Figure 3B:
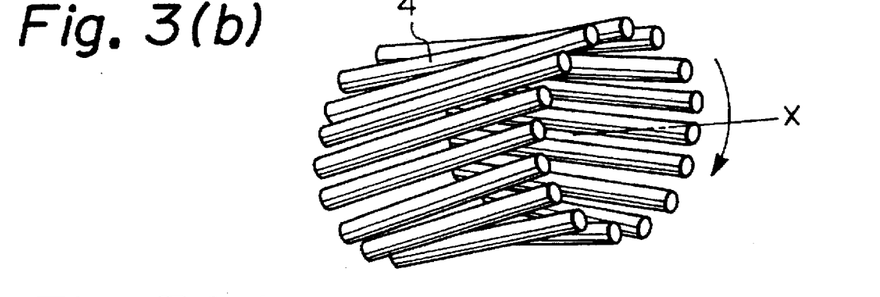
FIG. 3(b) is a view showing the discondition of the rollers relative the center axis of the inner and outer rings.

Here, the track surfaces 5 and 6 of the inner and outer rings 2 and 3 satisfactorily function only when the rollers 4 come in line contact with the track surfaces 5 and 6. As shown in FIGS. 3(a) and 3(b), the track surfaces 5 and 6 exhibit a hyperboloid contour that is loci of the outer periphery and the inner periphery of the rollers 4 scribed when each roller 4 revolves about the center axis X of the rolling bearing clutch.

Figure 3C:
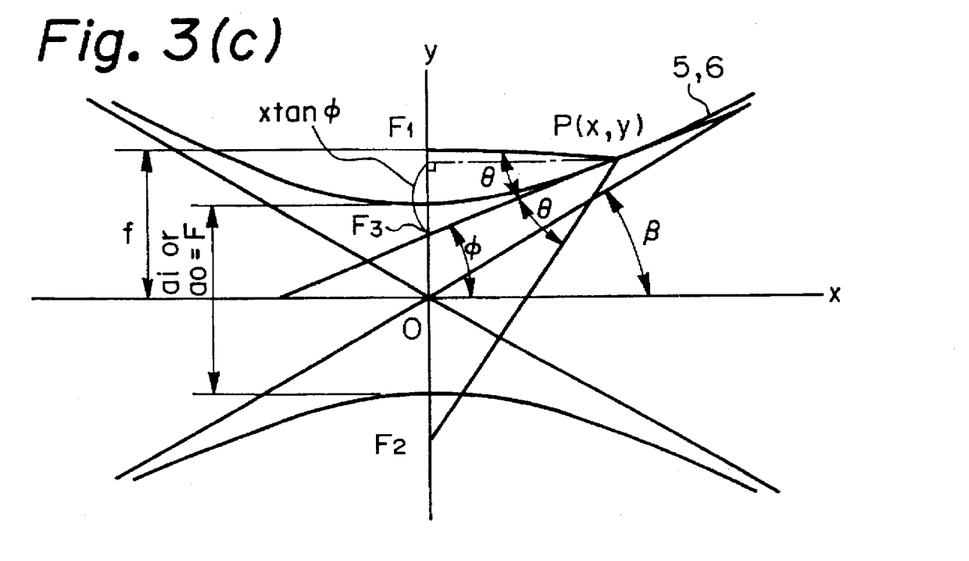
FIG. 3(c) is a diagram showing the relationship between the track surfaces, a socket angle of the track surface, a twist angle of the rollers and a wedge angle of the rollers.

As shown in FIGS. 2(b) and 3(c), the track surfaces 5 and 6 of the inner and outer rings 2 and 3 are inclined with a predetermined socket angle φ relative to the center axis X. As shown in FIG. 2(b), the socket angle φ is an angle defined by the center axis X and a tangential line a extending at a roller contact point P(x, y) located on the track sectional plane that exhibits a hyperbola sectioned by a plane extending through the center axis line X of the inner ring 2 and the outer ring 3.

The rollers 4 are retained by the retainer 7 in the equally spaced relationship. The twist angle β of the rollers 4 is not maintained by the retainer 7 but is automatically maintained by the hyperboloid contour of the track surfaces 5 and 6 of the inner and outer rings 2 and 3. The retainer 7 serves to hold the rollers 4 in order to prevent them from being scattered away when the inner and outer rings 2 and 3 are disassembled.

Next, the squeeze-in angle (ψ) will be described below with reference to FIG. 4.

Figure 4A:
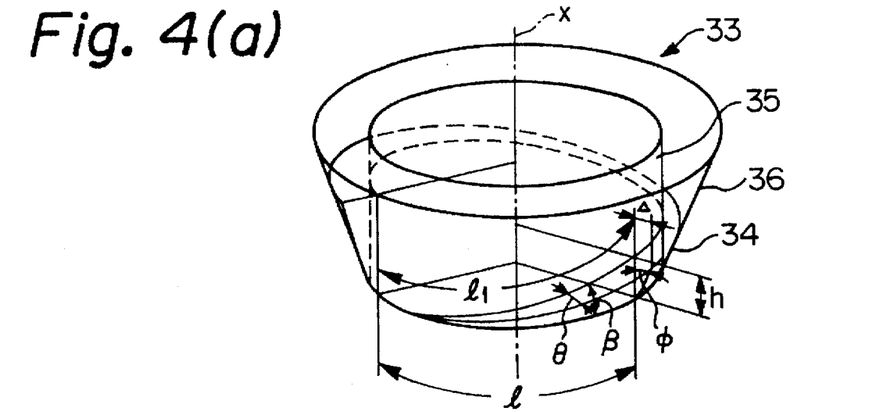
FIG. 4(a) is a view showing a screw thread of a taper screw.

FIG. 4(a) is a diagrammatic illustration which shows a taper screws. As shown in the drawing, a screw thread 34 of the taper screw 33 is spirally wound about an imaginary cylindrical surface 35 with the predetermined lead angle β, and at the same time, it is located on the outer periphery of a circular cone 36 of which diameter is upwardly increased with the predetermined socket angle φ relative to the center axis X. Accordingly, the outer diameter of the screw thread 34 exhibits a wedge-shaped contour which gradually enlarges with a predetermined angle θ as it goes upwardly relative to the imaginary cylindrical surface 35. This angle θ is called as a rolling wedge angle.

This rolling wedge angle θ is an increasing or decreasing angle which increases or decreases as a male thread and a female thread are twisted in the case of a taper screw. However, when the male thread is screwed in the female thread, a sum of both the rolling wedge angles becomes an actual wedge angle.

This wedge angle is defined as a squeeze-in angle ψ.

In the case of the rolling bearing clutch 1 of the invention, since each roller 4 interposed between the inner ring 2 and the outer ring 3 has a twist angle β, when the inner ring 2 and the outer ring 3 are rotated via the rollers 4, the inner ring 3 is screwed into the outer ring 3 in one direction of rolling of the roller 4 as if there are screws, and the rollers 4 are squeezed between the track surfaces 5 and 6 of the inner ring 2 and the outer ring 3, whereby entirely the same relationship as the taper screw 33 is established.

Figure 4B:
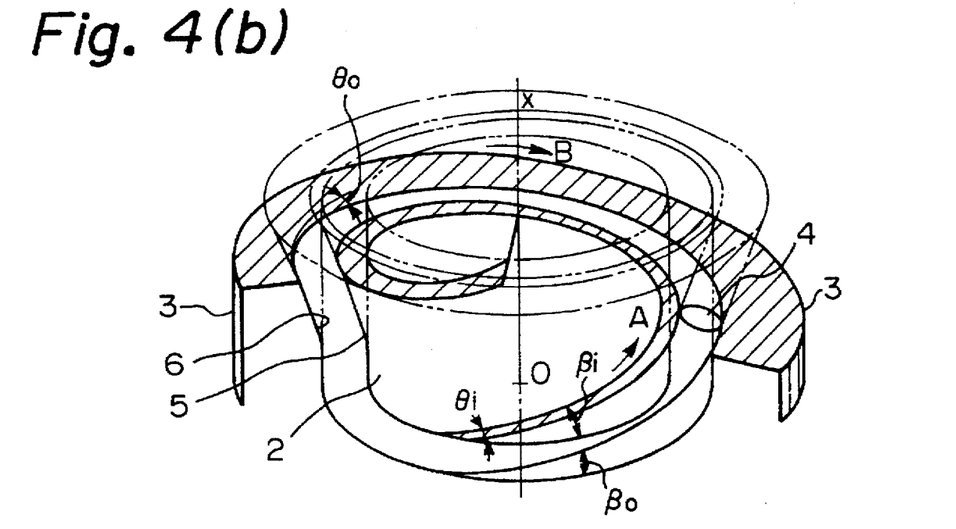
FIG. 4(b) is a view showing spirally sectioned inner and outer rings of the rolling bearing clutch.

FIG. 4(b) shows a schematic view which spirally sections the inner and outer rings 2 and 3 of the rolling bearing clutch 1 in the direction of rolling of the rollers 4. As shown in the drawing, the track surface 5 on the inner ring 2 is inclined in such a way that it is gradually increases in diameter with a rolling wedge angle θi in one spiral direction (arrow A), while the track surface 6 on the outer ring 3 is inclined in such a way that it is gradually decreased in diameter with a wedge angle θo in the other spiral direction (arrow B).

Figure 4C:
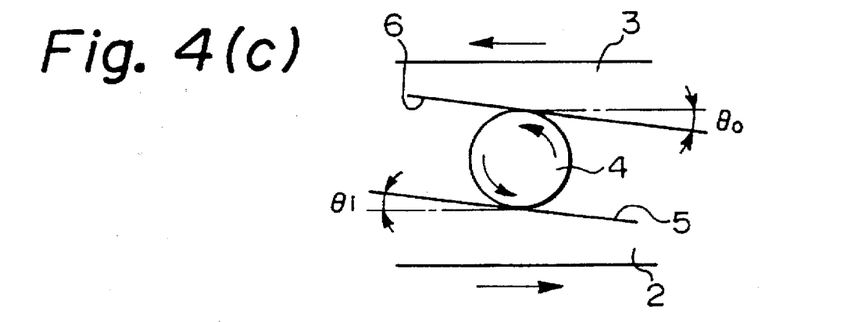
FIG. 4(c) is a schematic view showing the relationship between the roller and the track surfaces of the inner and outer rings.

FIG. 4(c) is a schematic view that shows that the roller 4 interposed between the track surfaces 5 and 6 is viewed in the axial direction. When the inner ring 2 and the outer ring 3 are moved in such a direction that the distance between the track surfaces 8a and 9a of the inner ring 2 and the outer ring 3 is narrowed, the roller 4 is squeezed therebetween. Since the squeezing of the roller 4 is affected by both of the rolling wedge angle θi on the inner ring 2 and the rolling wedge angle θo on the outer ring 3, the resultant summed angle $(θ_i+θ_o)$ is defined as a squeeze-in angle ψ.

In the conventional roller bearing clutch, when the roller 4 is locked as it rolls between the track surfaces 5 and 6 of the inner ring 2 and the outer ring 3 and is squeezed therebetween, a slippage should not be caused at the contact portions between the roller 4 and the track surfaces 5 and 6.

However, in the present invention, slippage is caused at the contact portions between the roller 4 and the track surfaces 5 and 6 as they rotate in the locking direction in order to prevent the roller 19 from being squeezed therebetween. This condition is established by the condition that at least one of the rolling wedge angles θi and θo at the contact portions between the roller 4 and the track surfaces 5 and 6 is made larger than frictional angles $\lambda_i$ and $\lambda_o$ corresponding to static frictional coefficients μsi and μso at the contact portions.

Here, the frictional angle λ is an angle at which an article starts to slide in the case the article is placed on a flat surface and then the latter is gradually inclined, where equations of tanλi=μsi and tanλo=μso are established.

Since any squeezing-in does not occur at the contact point of the roller 4 when there is slippage at least one of the contact portions on the inner ring 2 and the outer ring 3, an inequality of θi>λi or θo>λo should be established. It of course is obvious that inequalities of θi>λi and θo>λo may be established. In other words, at least one of two conditions of tanθi>μsi and tanθo>μso should be established.

FIG. 2(c) represents a squeeze-in angle ψ which is defined as a summed angle (θi+θo) of θi and θo.

Since it is considered that the inner and outer rings 2 and 3 are made of the same material, the static frictional coefficients at the contact portions between the roller 4 and both the track surfaces 5 and 6 are equal to each other, and the rolling contact angles θi and θo on the inner ring 2 and the outer ring 3 are substantially equal to each other, the squeeze-in angle (ψ) may be determined such that the relationship represented by the inequality of tan (ψ/2)>μs is established. Even though the squeeze-in angle is determined in that way, there does not arise any practical problem. In the drawing, N denotes a resistant force applied to the roller 4 from the contact surface, F denotes a frictional force and P denotes a synthesized force.

However, it is in practically difficult to measure and form such a rolling contact angle θ as mentioned above, and therefore, the contact angle θ is determined in association with the relationship between the roller twist angle β and the socket angle φ.

The contact angle θ, the roller twist angle β and the socket angle φ have a geometrically constant relationship as shown in FIG. 3(c).

From the taper screw model shown in FIG. 4(a), the relationship represented by the following equation is established.

$$\tan\theta = \sin\beta \cdot \tan\phi$$

Namely, an equation of Δ=l tanβ·tanφ is given from the relationship h=l tanβ and Δ=h tanφ. Also, in FIG. 6, $l_1$=l/cosβ and tanθ=Δ/$l_1$ are given. Thus, an equation of tanθ=cosβ·tanβ·tanφ=sinβ·tanφ is given.

Accordingly, it is sufficient for the roller twist angle β and the socket angle φ are determined in such a manner as to establish an inequality of sineβ·tanφ>μs. The value μs will vary depending on the materials employed for the inner ring 2, the outer ring 3 and the rollers 4, the lubricating condition or the like. In the case that μs is set to about 0.05, it is preferable that the roller twist angle β be set to the range of 21° to 24° and the socket angle φ be set to range of 8° to 10°.

When the roller twist angle β is set to 21° or less, there readily occurs a locked condition, and when the roller twist angle β is set to 25° or more, rolling becomes difficult. In addition, when the socket angle φ is set to 8° or less, there readily occurs a locked condition, and when the socket angle is in excess of 10°, there readily arises slippage, whereby stability is deteriorated.

When sinβ·tanφ is calculated, in the case of β:24° and φ:8°, it amounts to about 0.057, in the case of β:21° and φ:10°, it amounts to about 0.063 and in the case of β:21° and φ:8, it amounts to about 0.0503. Thus, it is larger than the maximum static frictional coefficient μs and satisfies the sliding conditions. At this time, the squeeze-in angle ψ is represented by about (ψ/2)=3°.

On the contrary, in a conventional rolling bearing clutch, while the roller twist angle β is set to 15° to 18°, the socket angle φ is used within the range of 4° to 4.5°.

When sinβ·tanφ in the conventional case is calculated, in the case of β:15° and φ:4°, it amounts to about 0.018, in the case of β:18° and φ:4.5°, it amounts to about 0.024 and in the case of β:18° and φ:4°, it amounts to about 0.021, thus it becomes smaller than the maximum static frictional coefficient and provides locking conditions.

It of course is obvious that the roller twist angle β and the socket angle φ are relative values. Thus, it is sufficient that the roller twist angle β is conventionally set to 15° to 18° and the socket angle φ is correspondingly selected so that sinβ·tanφ is set to the range of 0.05 or more. On the contrary, it is also sufficient that when the socket angle is conventionally set to the range of 4° to 4.5°, sinβ·tanφ is set to the range of 0.05 or more.

In addition, the present invention is applicable to the case where the roller twist angle β is set to a value other than the above-noted value, i.e., the range of 15° or less, the range of 18° to 21° or the range of 24° or more.

Further, the present invention is applicable to the case that the socket angle φ is set to the range of 4° or less, the range of 4.5° to 8° or the range of 10° or more.

Although, the maximum static frictional coefficient μ is set to about 0.05 in the example, it is possible to adjust the static frictional coefficient μ to assume a various value such as 0.1, 1.5 or the like. While the roller twist angle β and the socket angle φ are set to conventional angles, sliding conditions can be obtained by changing the maximum static frictional coefficient. Namely, even if the conventional roller twist angle is set to the range of 15° to 18° and the socket angle φ is set to the range of 4° to 4.5°, sliding conditions will be established if the maximum static frictional coefficient μs is set to be smaller than 0.02. The static frictional coefficient depends on the relative relationship between the static frictional coefficient μ and the rolling frictional angle θ or the squeeze-in angle ψ of the roller 4, and the static frictional coefficient is not restricted to 0.05.

As shown in FIG. 3(c), there is a geometrical constant relationship between the roller twist angle β and the socket angle φ.

The following relationship is given from FIG. 3(c).

Arithmetical formula 1

$$\tan\phi = \frac{x \cdot \tan^2\beta}{\sqrt{F^2 + x^2 \cdot \tan^2\beta}}$$

$$\tan\theta = \sin\beta \cdot \tan\phi = \sin\beta \cdot \frac{x \cdot \tan^2\beta}{\sqrt{F^2 + x^2 \cdot \tan^2\beta}}$$

In FIG. 3(c), the contour of the track surfaces 8a, 9a of the inner and outer rings 8, 9 is represented by the following equations.

$y_i^2/a_i^2 - x_i^2/b_i^2 = i$ $y_o^2/a_o^2 - x_o^2/b_o^2 = 1$

In FIG. 3(c), $F_1$ and $F_2$ denote focal points of hyperbolic curves representing the track surfaces.

Here, since the squeeze-in angle $\psi$ of the roller 4 is a sum of the rolling contact angles $\theta i$ and $\theta o$, the following formula is derived from the formula (1) and the relationship $\psi = \theta i + \theta o$.

Arithmetical formula 2

$$\psi = \tan^{-1} \frac{(y_1 + y_0) X \tan^2\beta \sin\beta}{y_1 \cdot y_0 - (X \tan^2\beta \sin\beta)^2}$$

F: arbitrary value given at the time of track designing $y_i$: track radius of inner ring at X $(F_1^2 + X^2 \cdot \tan^2\beta)^{1/2}$ $y_o$: track radius of outer ring at X $(F_o^2 + X^2 \cdot \tan^2\beta)^{1/2}$ $F_i = F - r$ $F_o = F + r$ r=radius of roller As shown in FIG. 3(c), the track sectional shape is determined by the frictional angle $\theta$ and the twist angle $\phi$ of the roller 4. The socket angle $\phi$ is determined depending on which range of the track section is practically used as a track surface. Namely, it is determined by the X coordinates of the roller contact point P ($x_o$ in the foregoing formula) and a value of preset F. The roller contact point is located at the central condition as seen in the axial direction of the roller.

Next, operation of the rolling bearing clutch constructed as above will be explained below.

An input shaft 20 is connected to a prime mover (not shown). The input shaft 20 relatively rotated in the locking direction of the inner and outer rings of the rolling bearing clutch 1. When the rolling bearing clutch 1 is shifted to the OFF condition while the input shaft 20 is rotated as above, the outer ring 3 is rotated together with the outer annulus 10. However, as stated above since the roller 4 rolls while sliding on the track surfaces without any spiral squeezing-in therebetween, the inner ring 2 is not rotated. When the control valve V shown in FIG. 1 is opened while the foregoing condition is maintained, the working oil is fed into the clutch ON/OFF working oil chamber 14 formed by the outer annulus 10, the inner annulus 11 and the piston 12. When the working oil is fed into the working oil chamber 14, the pressure is generated in the oil in the working oil chamber 14 due to the centrifugal force depending on a quantity of the working oil fed into the working oil chamber 14, the rotational speed or the like so that it serves to thrust the piston 12 into the leftward direction and thrust the inner annulus 11 in the rightward direction as seen in FIG. 1. Consequently, the outer ring 3 of the rolling bearing clutch 1 is thrust in the leftward direction as seen in FIG. 1 against the rightward resilient force of the preliminary pressure spring 19, causing the track surfaces of the outer ring 3 and the inner ring 2 to come near to each other, whereby the inner and outer rings 2 and 3 are brought in the locked condition and the rolling bearing clutch is shifted to the ON condition (connected). Therefore, the input shaft 20 and the output shaft 8 are mechanically connected to each other so that the torque is transmitted to an output shaft 8 from the input shaft 20.

The centrifugal pressure Px for actuating the rolling bearing clutch 1 is represented by the following formula.

$Px = \gamma \omega^2 (r^2 - r_x^2)/2g$

Here, $\gamma$ denotes a specific weight of the working oil, and $\omega$ denotes a rotational angular speed. When the working oil is fed by a flow rate of $Q_o$, an oil film having an innermost peripheral radius $r_x$ and an outermost peripheral radius r is formed in the working oil chamber 14. The outermost peripheral radius r is determined by the outer peripheral wall of the working oil chamber 14. When the working oil feeding flow rate $Q_o$ is increased, $r_x$ is decreased, and when $Q_o$ is decreased, $r_x$ is increased. As is apparent from the above description, it is possible that necessary centrifugal pressure Px is established by controlling the working oil feeding flow rate $Q_o$.

When the working oil is fed into the working oil chamber 14 while the control valve V is opened, centrifugal pressure is continuously generated, and at the same time, the working oil is normally discharged from a nozzle disposed in the outer annulus 10. Thus, when the feeding of the working oil into the working oil chamber 14 is interrupted during the torque loading by closing the control valve V, the working oil in the working oil chamber 14 is discharged from the nozzle 25, causing the thrusting force to the piston 12 to be released. Thus, the rollers 4 start to slide at the contact portions with the track surfaces 5 and 6 of the inner ring 2 and the outer ring 3 so that only the outer ring 3 is rotated but the inner ring 2 is not rotated, whereby the rolling bearing clutch 1 is immediately shifted to the OFF condition. Consequently, the mechanical coupling of the input shaft 20 to the output shaft 8 is immediately disconnected.

On the other hand, when the input shaft 20 is relatively rotated in the rolling direction opposite to the locking direction of the inner and outer rings of the rolling bearing clutch 1, without applying any thrusting force on the piston 12, the roller 4 is rotated while sliding in the clutch loosening direction so that the clutch is shifted to the OFF condition without transmitting any torque and only the outer ring 3 is freely rotated. When the thrusting force is applied to the outer ring 3 with the centrifugal pressure applied thereto while the foregoing condition is maintained, the track surfaces of the outer ring 3 and the inner ring 2 come near to each other so that the rolling bearing clutch is shifted to the ON condition. Thus, when the rolling bearing clutch according to this embodiment is used, the rotating torque can be transmitted in both directions.

Next, another embodiment of the first aspect of the present invention will be described with reference to FIGS. 5 and 6. In the embodiments shown in FIGS. 5 and 6 either, conditions that the rollers can slide at the contact portions with the track surfaces are settled in order to prevent the rollers from being squeezed in the track surfaces of the inner ring and the outer ring even they are rotated in the locking direction. Since the rolling bearing clutch is constructed entirely the same manner as the first embodiment, description on the relationship on the rolling contact angle between the rollers and the inner and outer rings is herein omitted. Components having the same operation and function as those shown in FIG. 1 are represented by the same reference numerals, and repeated description thereof is also omitted.

Figure 5:
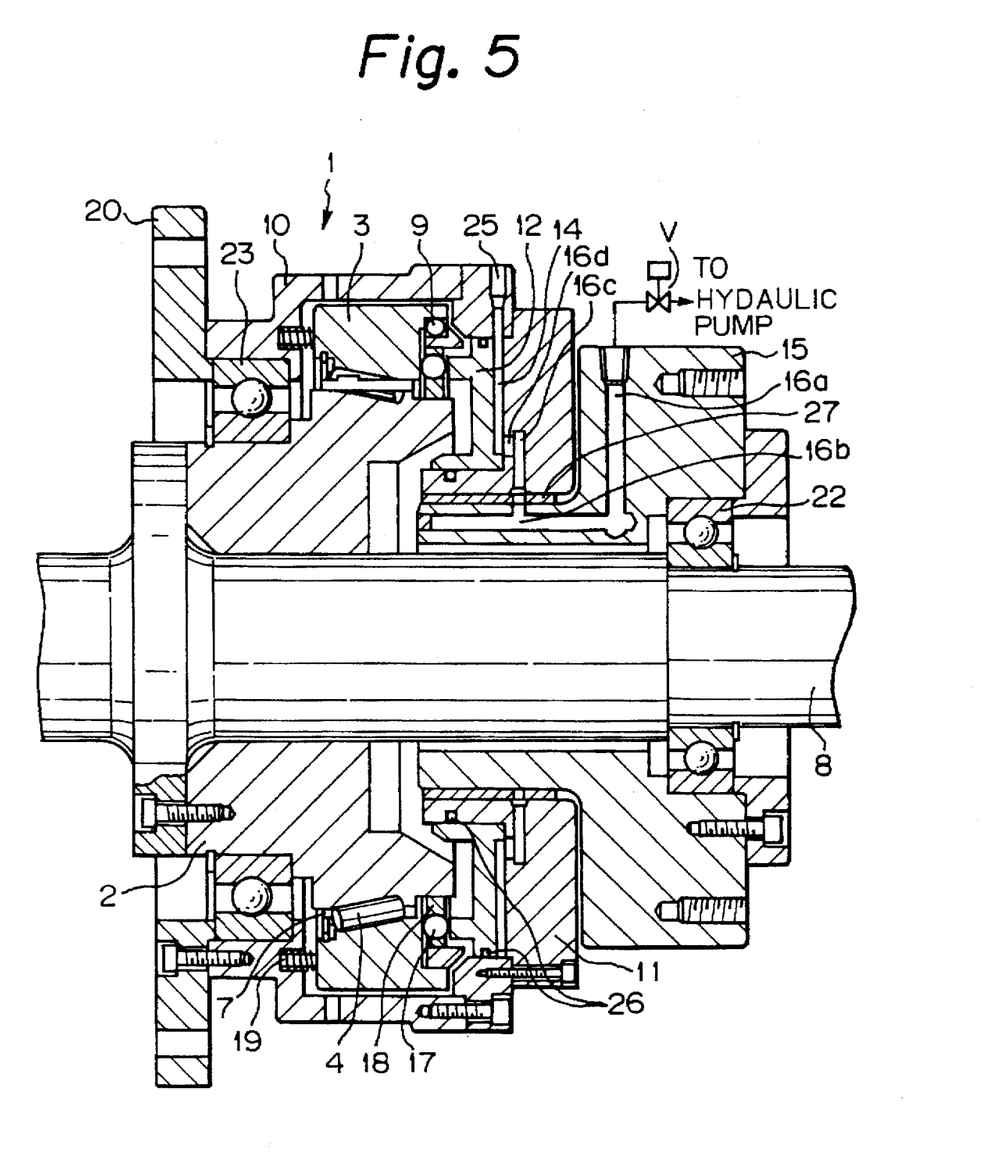
FIG. 5 is a sectional view showing a rolling bearing clutch according to a second embodiment of the first aspect of the present invention.

A second embodiment of the first aspect of the present invention is shown in FIG. 5. In this embodiment, an inner ring 2, an outer ring 3, rollers 4, an outer annulus 10, an inner annulus 11 and so forth are same as those in the first embodiment shown in FIG. 1. This embodiment is different from the first embodiment in respect of a point that the thrusting force for driving a piston 12 is not caused by the centrifugal pressure but is caused by the fluid pressure (static pressure) of the working oil itself supplied from a pump. Specifically, in this embodiment, a slide bearing 27 made of a metallic material is interposed between the inner ring 11 and a stationary flange 15. When a control valve V is opened, a predetermined intensity of high pressure oil is fed into a working oil chamber 14. The piston 12 is displaced in the leftward direction by the pressure of the working oil to thrust the outer ring 3 in the leftward direction so that the track surfaces of the outer ring 3 and the inner ring 2 come near to each other, causing the rolling bearing clutch to be shifted to the ON condition. Other structure and function of the rolling bearing clutch are same as those in the embodiment shown in FIG. 1.

Figure 6:
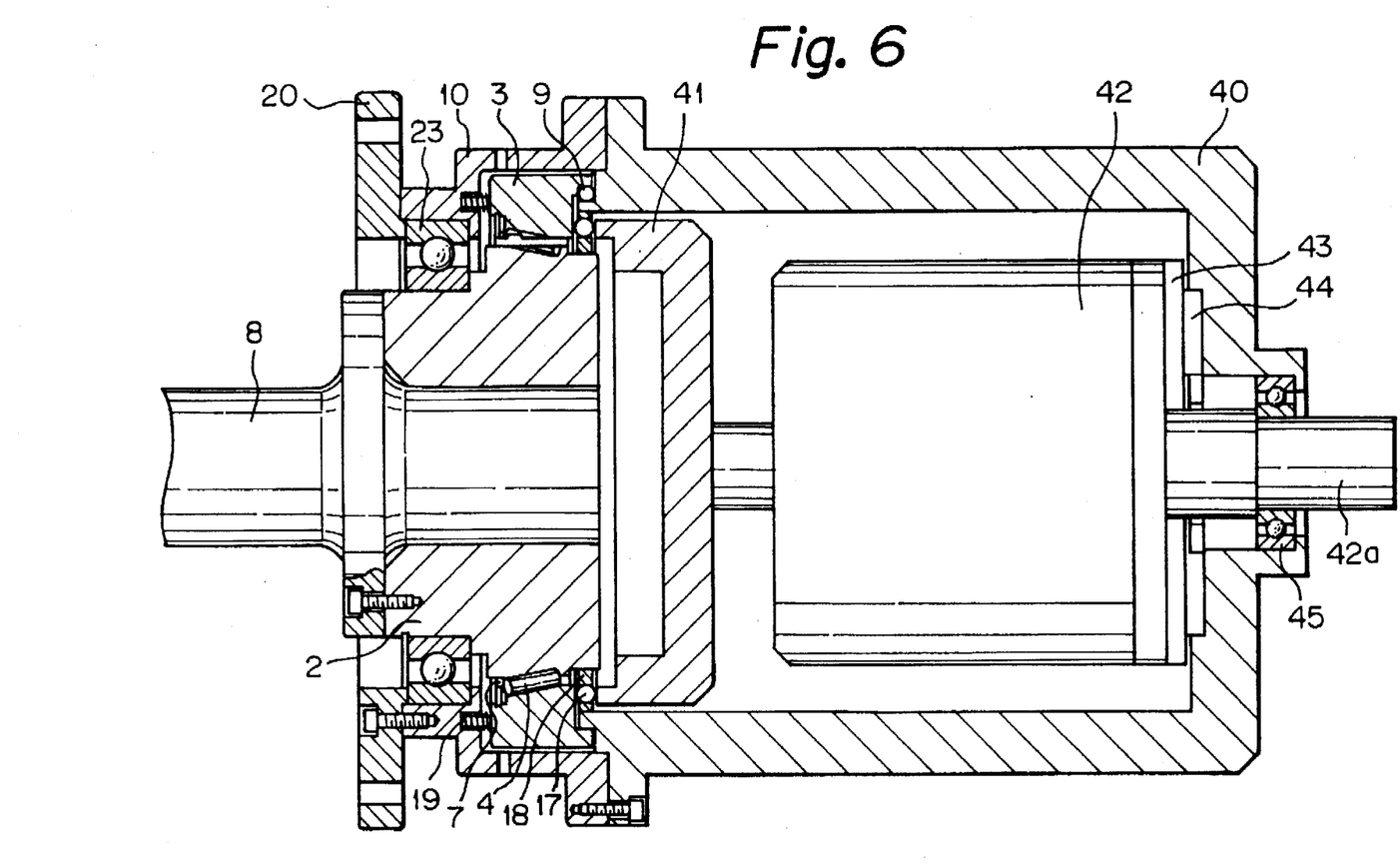
FIG. 6 is a sectional view showing a rolling bearing clutch according to a third embodiment of the first aspect of the present invention.

A third embodiment of the first aspect of the present invention is shown in FIG. 6. In this embodiment, an inner ring 2, an outer ring 3, rollers 4, an outer annulus 10 and so forth are same as those in the embodiment shown in FIG. 1. In this embodiment, however, means for thrusting the outer ring 3 is composed of a piston and an actuator. Specifically, a casing 40 is connected to the outer ring 10, and a piston 41 and a hydraulic cylinder 42 for driving the piston 41 are received in the casing 40. The foremost end of the piston 41 comes in contact with a plurality of thrust balls 17, and a bearing receiver 43 is fixed to the rear end of the hydraulic cylinder 42. A thrust bearing 44 is interposed between the bearing receiver 43 and the casing 40.

The hydraulic cylinder 42 includes a stationary portion 42a at the rear end part thereof, and a radial bearing 45 is interposed between the stationary portion 42a and the casing 40.

In this embodiment, when the hydraulic cylinder 42 is not operated, the rolling bearing clutch is shifted to the OFF condition. When the hydraulic cylinder 42 is actuated, the piston 41 is displaced in the leftward direction to thrust the outer ring 3 in the leftward direction, and the track surface of the outer ring 3 and the inner ring 2 come near to each other, causing the rolling bearing clutch to be shifted to the ON condition. Other structures and functions are the same as those in the embodiment shown in FIG. 1.

Next, an embodiment of the second aspect of the present invention will be described with reference to FIGS. 7 to 9. In the embodiment shown in FIGS. 7 to 9, the rolling bearing clutch is constructed in such a way that it is shifted to the ON condition by thrusting an outer ring with thrusting means while the inner and outer rings are relatively rotated in the rolling direction opposite to the locking direction, and the rolling bearing clutch is employed as a one-way clutch. The structure of the track surfaces of the inner and outer rings is entirely the same as that of the conventional rolling bearing clutch but in contrast with the conventional rolling bearing clutch, so called screw-back operation is not required.

Figure 7:
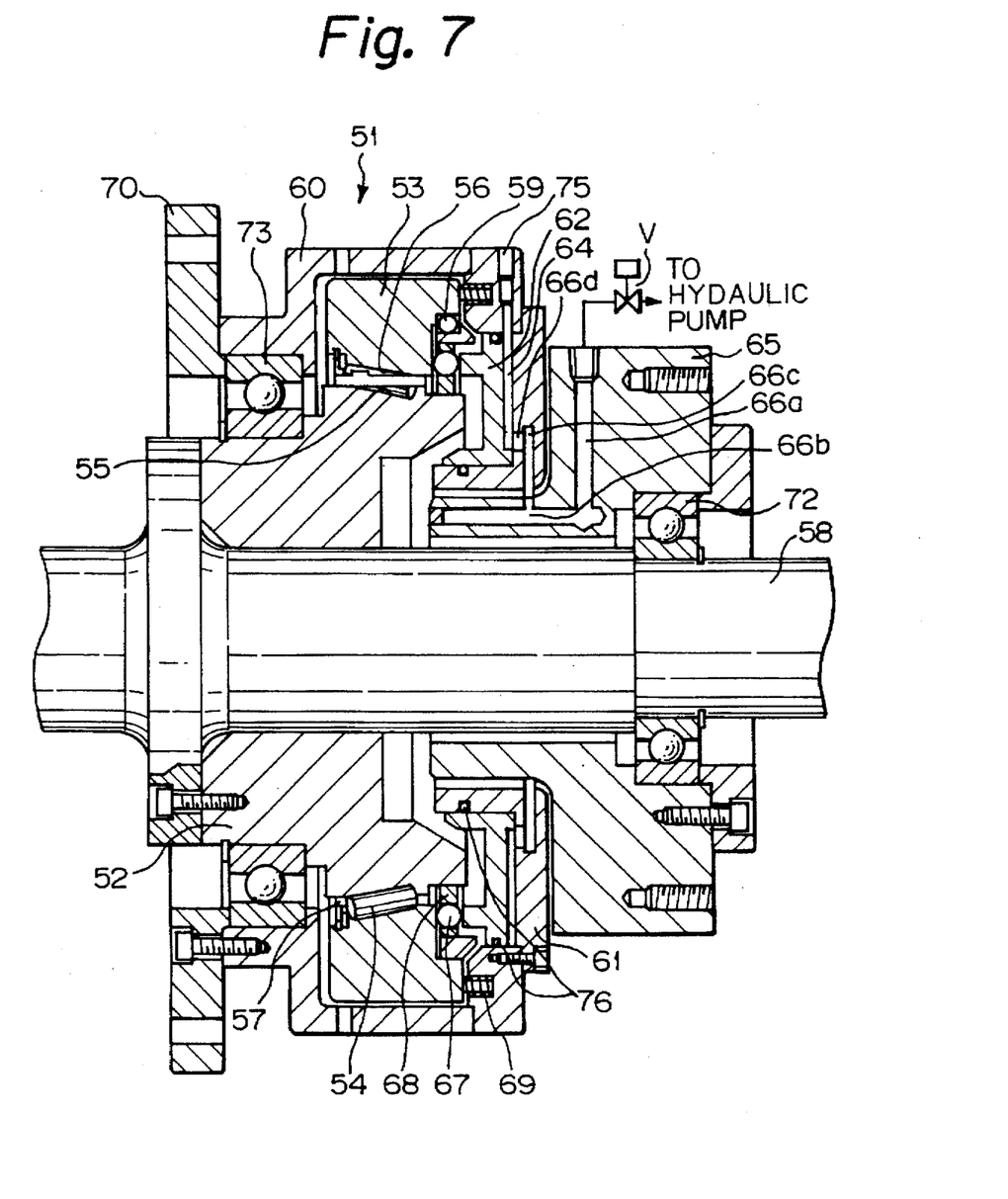
FIG. 7 is a sectional view showing a rolling bearing clutch according to a first embodiment of a second aspect of the present invention.

FIG. 7 is a sectional view which shows a first embodiment of the second aspect of the present invention. The rolling bearing clutch 51 includes an inner ring 52, an outer ring 53, a plurality of cylindrical rollers 54 interposed between the outer periphery of the inner ring 52 and the inner periphery of the outer ring 53, and a retainer 57 for retaining the rollers 54 at predetermined conditions. The inner ring 52 is fixed directly to an output shaft 58. The outer ring 53 is connected to the outer annulus 60 via a ball spline mechanism 59, and the outer ring 53 is relatively displaceable in the axial direction relative to the outer annulus 60, while it is rotated together with the outer annulus 60 in the rotating direction. An input shaft 70 is connected to the outer annulus 60.

An inner annulus 61 is fixed to the outer annulus 60, and the space surrounded by the outer annulus 60 and the inner annulus 61 constitutes a cylinder portion in which a piston 62 is axially displaceably arranged. And, a clutch ON/OFF working oil chamber 64 is defined between the inner surface of the cylinder portion and the piston 62 and working oil is fed to the working oil chamber 64 via working oil feeding passages 66a, 66b, 66c and 66d formed in the stationary flange 65 and the inner annulus 61. The working oil feeding passage 66a is connected to a hydraulic pump via a control valve V. In addition a working oil discharging nozzle 75 communicated with the working oil chamber 64 is provided in the outer annulus 60.

A plurality of thrust balls 67 are interposed between the piston 62 and the outer annulus 53. The thrust balls 67 are retained in a circular disc-like retainer 68. A plurality of preliminary pressure springs 69 are interposed between the outer ring 53 and the outer annulus 60 so that preliminary pressure is imparted to the rollers 54 by thrusting the outer ring 53 relative to the inner ring 52 in the axial direction. A radial bearing 72 is interposed between a stationary flange 65 and an output shaft 58, and a radial bearing 73 is interposed between the outer annulus 60 and the inner ring 52. Reference numeral 76 denotes an O-ring seal.

The structure of track surfaces 55 and 56 of the inner ring 52 and the outer ring 53 exhibits the entirely same hyperboloid contour as that of the conventional rolling bearing clutch and description on it is herein omitted.

Next, operation of the rolling bearing clutch constructed as above will be described below.

An input shaft 70 is connected to a prime mover (not shown). In this embodiment, the input shaft 70 is relatively rotated only in the rolling direction opposite to the locking direction of the inner and outer rings of the rolling bearing clutch 51. When the rolling bearing clutch 51 is shifted to the OFF condition while the input shaft 70 is rotated, the outer ring 53 is rotated together with the outer annulus 60 but a rolling component effective for parting the inner and outer rings 52 and 53 away from each other by the rolling of the roller 54 is generated, allowing the rollers 54 to be rotated freely. Thus, the inner ring 52 is not rotated. When the control valve V is opened while the foregoing condition is maintained, the working oil is fed into the working oil chamber 54 so that pressure is induced in the working oil in the working oil chamber 54 by the centrifugal force. The piston 62 is, thus, thrust in the leftward direction by the centrifugal pressure, and the track surfaces of the outer ring 53 and the inner ring 52 come near to each other so that the rolling bearing clutch 51 is shifted to the ON condition, causing the input shaft 70 to be mechanically coupled to the output shaft 58. When the feeding of the working oil into the working oil chamber 64 is interrupted by closing the control valve V during the torque loading, the working oil in the working oil chamber 64 is discharged from the nozzle 75 by the centrifugal force so that the piston 62 is released from the thrust condition. Thus, a component effective for moving the inner and outer rings 52 and 53 away from each other by the rolling of the rollers 54 is generated, and the rollers 54 are rotated freely so that the rolling bearing clutch 51 is immediately shifted to the OFF condition.

Figure 8:
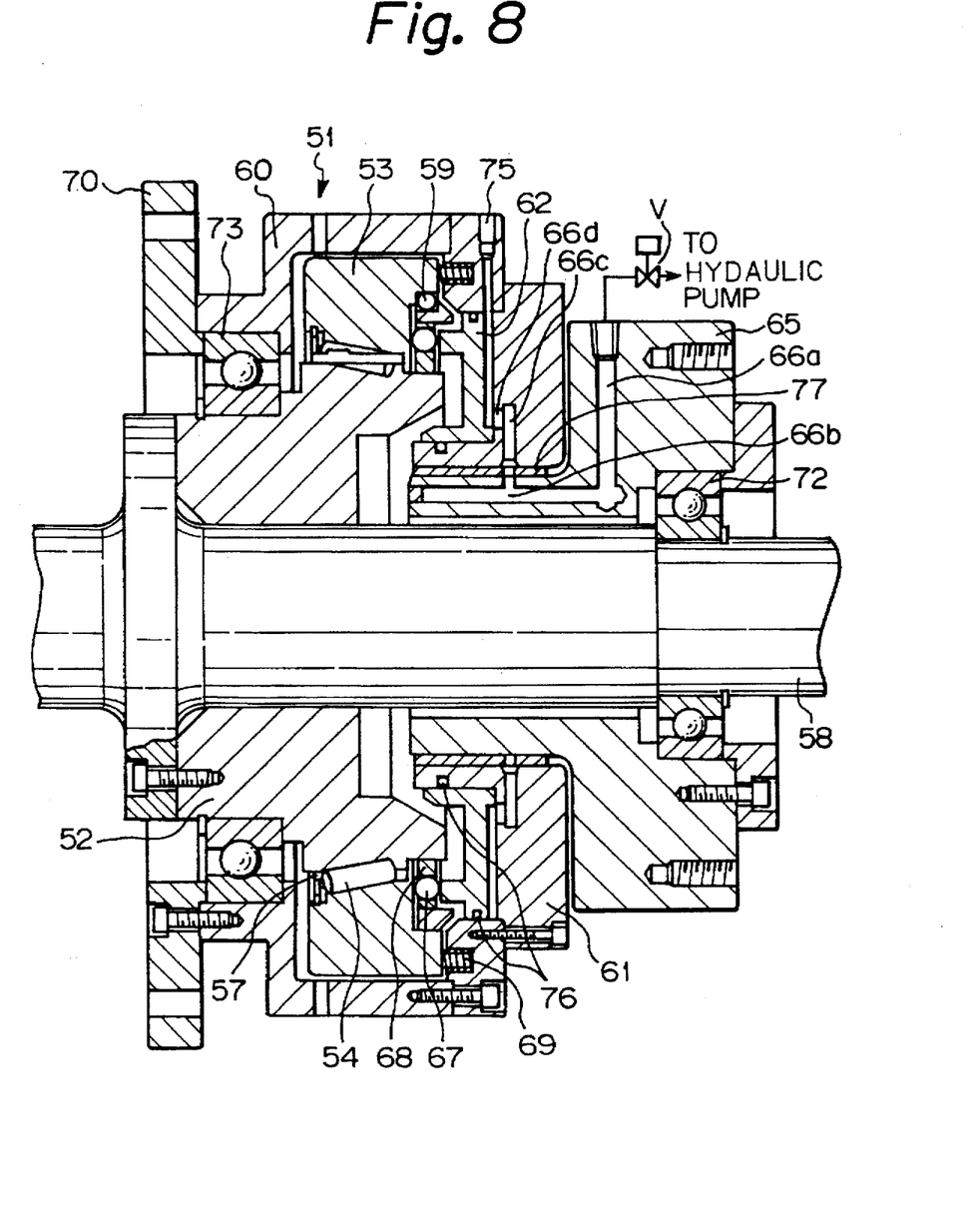
FIG. 8 is a sectional view showing a rolling bearing clutch according to a second embodiment of the second aspect of the present invention.

A second embodiment of the second aspect of the present invention is shown in FIG. 8. In this embodiment, an inner ring 52, an outer ring 53, a plurality of rollers 54, an outer annulus 60, an inner annulus 61 and so forth are the same as those in the first embodiment. This embodiment is different from the first embodiment in respect of a point that the thrusting force for driving a piston 62 is not caused by the centrifugal force but it is caused by fluid pressure (static pressure) of the working oil itself supplied from a pump. Specifically, in this embodiment, a slide bearing 77 made of a metallic material is interposed between the inner annulus 61 and a stationary flange 65. When a control valve V is opened, a predetermined intensity of high pressure working oil is fed into the working oil chamber 64. A piston 62 is displaced in the leftward direction by the pressure of the working oil to thrust the outer ring 53 in the leftward direction so that the track surfaces of the outer ring 53 and the inner ring 52 come near to each other, causing the rolling bearing clutch to be shifted to the ON condition. Other structure and functions are same as those in the embodiment shown in FIG. 7.

Figure 9:
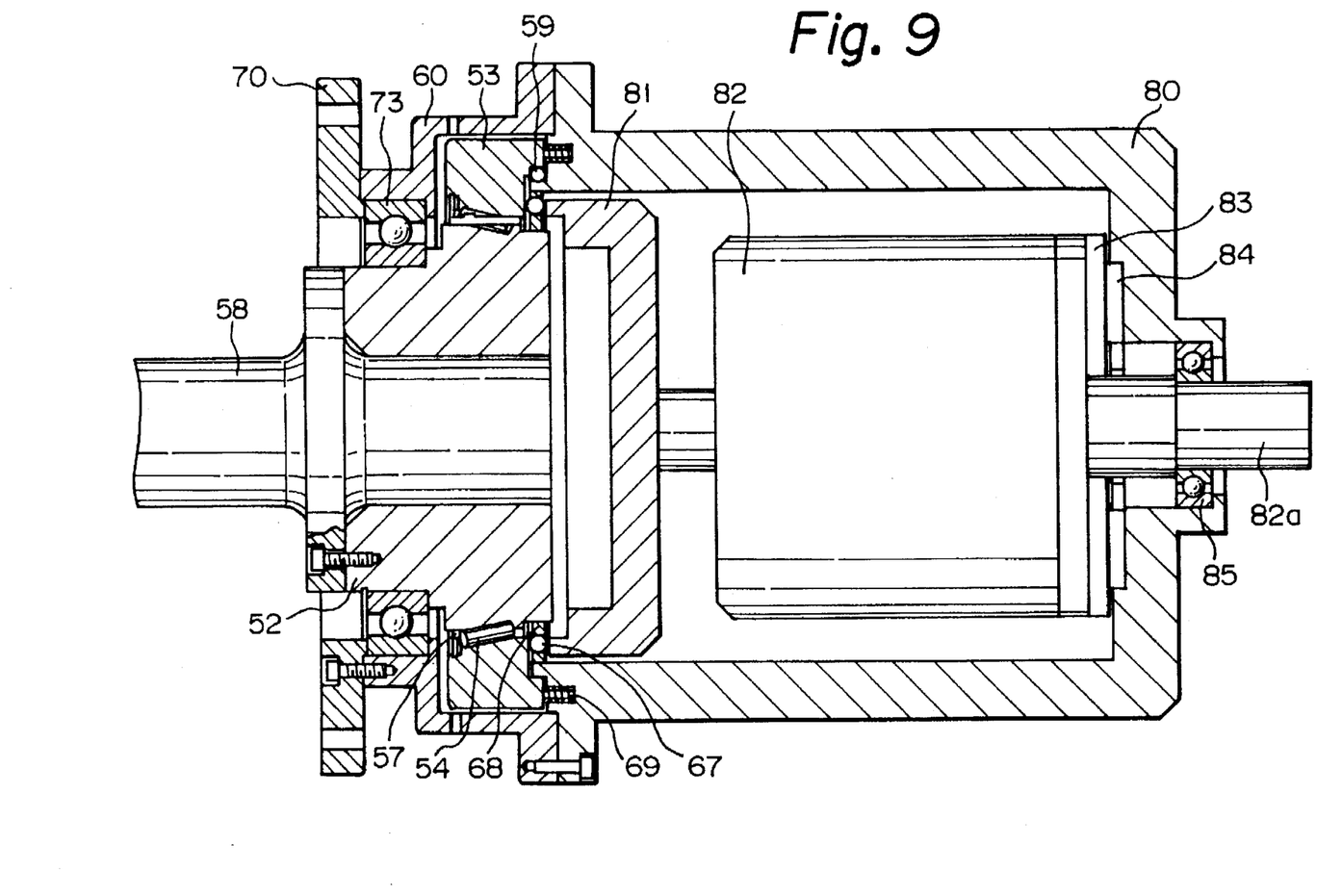
FIG. 9 is a sectional view showing a rolling bearing clutch according to a third embodiment of the second aspect of the present invention.

A third embodiment of the second aspect of the present invention is shown in FIG. 9. According to this embodiment, an inner ring 52, an outer ring 53, a plurality of rollers 54, an outer annulus 60 and so forth are the same as those in the embodiment shown in FIG. 7. In this embodiment, means for imparting a thrust force onto the outer ring 53 is composed of a piston and an actuator. Specifically, a casing 80 is connected to an outer annulus 60, and a piston 81 and a hydraulic cylinder 82 for driving the piston 81 are received in the casing 80. The foremost end of the piston 81 comes in contact with a plurality of thrust balls 67, and a bearing receiver 83 is fixed to the rear end of a hydraulic cylinder 82. A thrust bearing 84 is interposed between the bearing receiver 83 and the casing 80.

The hydraulic cylinder 82 includes a stationary portion 82a at the rear part thereof, and a radial bearing 85 is interposed between the stationary portion 82a and the casing 80.

In this embodiment, when the hydraulic cylinder 82 is not operated, the rolling bearing clutch is shifted to the OFF condition. When the hydraulic cylinder 82 is actuated, the piston 81 is displaced in the leftward direction to thrust the outer ring 53 in the leftward direction so that the track surfaces of the outer ring 53 and the inner ring 52 come near to each other, causing the rolling bearing clutch to be shifted to the ON condition. Other structure and functions are same as those in the embodiment shown in FIG. 7.

As described above, according to the present invention, the track surfaces of the inner ring and the outer ring come near to each other by the operation of the thrusting means while the inner and outer rings are relatively rotated, whereby the rolling bearing clutch can be shifted to the ON condition by locking the inner and outer rings, and when the thrusting means is shifted from the thrust condition during the torque loading, the track surfaces of the inner and outer rings are parted away from each other so that the rolling bearing clutch can be shifted to the OFF condition. Therefore, in contrast with the conventional rolling bearing clutch, it is not necessary to perform screw-back operation when the rolling bearing clutch is shifted to the OFF condition, and the rolling bearing clutch can easily be shifted to the OFF condition even during the torque loading.

According to the first aspect of the present invention, since the torque can be transmitted in both directions, the rolling bearing clutch can be employed for various applications.

What is claimed is:

1. A rolling bearing clutch, comprising:
   an inner ring;
   an outer ring;
   a plurality of rollers interposed between the track surfaces formed on the outer periphery of said inner ring and the inner periphery of said outer ring, wherein said rollers are provided with a predetermined twist angle ($\beta$) relative to the center axis of said inner and outer rings, wherein each of the track surfaces of said inner ring and said outer ring is formed by a hyperboloid contour that is a revolving locus scribed when said rollers are rotated about the center axis, wherein when said inner and outer rings are relatively rotated in one direction, said inner and outer rings are locked and when said inner and outer rings are relatively rotated in another direction, said inner and outer rings are freely rotatable, wherein the rolling contact angle of at least one of contact portions of each of said rollers with the track surfaces of said outer ring and said inner ring as seen in the axial direction of said rollers is set to be larger than the frictional angle corresponding to the static frictional coefficient at the contact portion, wherein when said inner and outer rings are rotated in the one direction, said rollers can slide at the contact portions with the track surfaces of said inner ring and said outer ring; and thrusting means for moving the track surfaces of said inner ring and said outer ring close to each other, said inner and outer rings being locked by thrusting said inner or outer ring by said thrusting means, with said inner and outer rings being relatively rotated in the one direction, wherein said rolling bearing clutch is brought in the ON condition and said rolling bearing clutch is brought into the OFF condition by allowing said rollers to slide at the contact portions with the track surfaces of said inner ring and said outer ring by releasing said thrusting means from the trust condition.

2. The rolling bearing clutch as claimed in claim 1, wherein as a condition that said rollers slide at the contact portions with the track surfaces of said inner and outer rings while said inner and outer rings are relatively rotated in the one direction, the relationship represented by an inequality of tan ($\psi/2$)>$\mu s$ in a relationship between a squeeze-in angle ($\psi$) defined between said rollers and track surfaces of said inner and outer rings as seen in the axial direction of said rollers and a static frictional coefficient ($\mu$) at the contact portion is established.

3. The rolling bearing clutch as claimed in claim 2, wherein a maximum static frictional coefficient is set to about 0.05.

4. The rolling bearing clutch as claimed in claim 3, wherein a socket angle ($\phi$) is defined by an angle between said center axis and the tangential line of said rollers with the track surface of said outer ring, a twist angle ($\beta$) of each roller is set to the range of 21° to 24° and said socket angle ($\phi$) is set to the range of 8° to 10°.

5. The rolling bearing clutch as claimed in claim 1, wherein said thrusting means comprises a piston engageable with said outer ring and means for applying fluid pressure to the pressure receiving surface of said piston.

6. The rolling bearing clutch as claimed in claim 5, wherein said means for applying fluid pressure comprises a working oil chamber defined between the pressure receiving surface of said piston and a cylinder portion adapted to receive said piston, a working oil feeding portion for feeding the working oil to said working oil chamber, and a nozzle for discharging the working oil from said working oil chamber, said fluid pressure is centrifugal pressure caused by the centrifugal force applied to the working oil in said working oil chamber.

7. The rolling bearing clutch as claimed in claim 5, wherein said means for applying fluid pressure comprises a working oil chamber defined between the pressure receiving surface of said piston and a cylinder portion adapted to receive said piston, a working oil feeding portion for feeding the working oil to said working oil chamber, and a nozzle for discharging the working oil from said working oil chamber, said fluid pressure is formed by feeding an increased pressure working oil into said working oil chamber.

8. The rolling bearing pressure as claimed in claim 1, wherein said thrusting means comprises a piston engageable with said outer ring and an actuator for driving said piston.

9. A rolling bearing clutch, comprising:
   an inner ring;
   an outer ring;
   a plurality of rollers interposed between the track surfaces formed on the outer periphery of said inner ring and the inner periphery of said outer ring, wherein said rollers are provided with a predetermined twist angle ($\beta$) relative to the center axis of said inner and outer rings, wherein each of the track surfaces of said inner ring and said outer ring is formed by a hyperboloid contour that is a revolving locus scribed when said rollers are rotated about the center axis, and wherein when said inner and outer rings are relatively rotated in one direction, said inner and outer rings are brought into the locked condition and when said inner and outer rings are relatively rotated in another direction, said inner and outer rings are freely rotatable; and
   thrusting means for moving the track surfaces of said inner ring and said outer ring close to each other, wherein said inner and outer rings are locked by imparting a thrust force to said inner or outer ring with said thrusting means, with said inner and outer rings being relatively rotated in another direction opposite to the one direction, wherein said rolling bearing clutch is shifted to the ON condition and said inner and outer rings are freely relatively rotatable by releasing said thrusting means from the thrust condition, and wherein said rolling bearing clutch is shifted to the OFF condition.

10. The rolling bearing clutch as claimed in claim 9, wherein said thrusting means comprises a piston engageable with said outer ring and means for applying the fluid pressure to the pressure receiving surface of said piston.

11. The rolling bearing clutch as claimed in claim 10, wherein said means for applying fluid pressure comprises a working oil chamber defined between the pressure receiving surface of said piston and a cylinder portion adapted to receive said piston, a working oil feeding portion for feeding the working oil to said working oil chamber, and a nozzle for discharging the working oil from said working oil chamber, said fluid pressure is centrifugal pressure formed by the centrifugal force applied to the working oil in said working oil chamber.

12. The rolling bearing clutch as claimed in claim 10, wherein said means for applying fluid pressure comprises a working oil chamber defined between the pressure receiving surface of said piston and a cylinder portion adapted to receive said piston, a working oil feeding portion for feeding the working oil to said working oil chamber, and a nozzle for discharging the working oil from said working oil chamber, said fluid pressure is formed by feeding an increased pressure working oil to the working oil chamber.

13. The rolling bearing clutch as claimed in claim 9, wherein said thrusting means comprises a piston engageable with said outer ring and an actuator for driving said piston.

* * * * *